(12) United States Patent
Jiang et al.

(10) Patent No.: US 10,506,311 B2
(45) Date of Patent: Dec. 10, 2019

(54) SYSTEM AND METHOD FOR OPTICAL NETWORK

(71) Applicant: Huawei Technologies Co., Ltd., Shenzhen (CN)

(72) Inventors: Zhiping Jiang, Kanata (CA); Chen Chen, San Jose, CA (US); Zhuhong Zhang, Ottawa (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 15/205,670

(22) Filed: Jul. 8, 2016

(65) Prior Publication Data

US 2016/0323660 A1 Nov. 3, 2016

Related U.S. Application Data

(63) Continuation of application No. 14/877,280, filed on Oct. 7, 2015, now Pat. No. 9,749,723.
(Continued)

(51) Int. Cl.
*H04Q 11/00* (2006.01)
*H04J 14/02* (2006.01)
(Continued)

(52) U.S. Cl.
CPC ......... *H04Q 11/0005* (2013.01); *H04B 10/25* (2013.01); *H04B 10/503* (2013.01);
(Continued)

(58) Field of Classification Search
CPC ............... H04J 14/0282; H04J 14/0257; H04J 14/0275; H04J 14/0204; H04J 14/0227; H04J 14/0209; H04J 14/00
See application file for complete search history.

(56) References Cited

U.S. PATENT DOCUMENTS 4,028,500 A * 6/1977 McClure ............... H04W 76/10
455/566
4,144,496 A * 3/1979 Cunningham ....... H04B 7/2621
455/447
(Continued)

FOREIGN PATENT DOCUMENTS

CN 101742363 A 6/2010

OTHER PUBLICATIONS

"Capable." Merriam-Webster.com. Accessed Jun. 25, 2018. https://www.merriam-webster.com/dictionary/capable.*
(Continued)

*Primary Examiner* — Tanya T Motsinger
(74) *Attorney, Agent, or Firm* — Slater Matsil, LLP

(57) ABSTRACT

An optical circuit switching matrix includes a plurality of optical ports, each optical port being optically coupled to a respective one of a plurality of user nodes and an optical coupler having at least one input port optically coupled to the plurality of optical ports, and an output port. The optical circuit switching matrix also includes a wavelength demultiplexer having an input optically coupled to the output port of the optical coupler, and a plurality of output ports, each output port being optically coupled to a respective one of the plurality of optical ports.

29 Claims, 14 Drawing Sheets

Related U.S. Application Data

(60) Provisional application No. 62/128,627, filed on Mar. 5, 2015.

(51) Int. Cl.
*H04B 10/25* (2013.01)
*H04B 10/50* (2013.01)
*H04B 10/572* (2013.01)

(52) U.S. Cl.
CPC .......... *H04B 10/572* (2013.01); *H04J 14/021* (2013.01); *H04J 14/0275* (2013.01); *H04J 14/0282* (2013.01); *H04Q 2011/005* (2013.01); *H04Q 2011/0016* (2013.01); *H04Q 2011/0018* (2013.01); *H04Q 2011/0032* (2013.01); *H04Q 2011/0033* (2013.01); *H04Q 2011/0039* (2013.01); *H04Q 2011/0041* (2013.01); *H04Q 2011/0058* (2013.01)

(56) References Cited

U.S. PATENT DOCUMENTS

| | | | | |
|---|---|---|---|---|
| 4,924,457 | A * | 5/1990 | Shimizu | H04W 4/24 370/346 |
| 5,452,115 | A * | 9/1995 | Tomioka | H04J 14/0227 398/14 |
| 5,717,510 | A * | 2/1998 | Ishikawa | H04B 10/0795 398/147 |
| 5,870,216 | A * | 2/1999 | Brock | H04B 7/18504 398/49 |
| 6,141,126 | A * | 10/2000 | Lahat | H04Q 11/0005 398/1 |
| 6,466,343 | B1 * | 10/2002 | Lahat | H04Q 11/0005 398/82 |
| 6,718,141 | B1 * | 4/2004 | deVette | H04B 10/0771 370/218 |
| 6,738,582 | B1 * | 5/2004 | Moshe | H04J 3/0626 375/327 |
| 6,775,693 | B1 * | 8/2004 | Adams | G06F 13/28 709/213 |
| 6,954,593 | B1 * | 10/2005 | Fuse | H04B 10/505 398/154 |
| 7,190,896 | B1 * | 3/2007 | Wang | H04Q 11/0066 398/30 |
| 8,559,817 | B2 * | 10/2013 | Sarlet | H04J 14/0256 398/196 |
| 9,888,302 | B2 * | 2/2018 | Chen | H04L 12/437 |
| 2002/0054614 | A1 * | 5/2002 | Jin | H01S 5/141 372/20 |
| 2002/0154357 | A1 * | 10/2002 | Ozveren | H04J 14/0201 398/85 |
| 2003/0170025 | A1 * | 9/2003 | Bortolini | H04J 14/0204 398/50 |
| 2003/0193937 | A1 | 10/2003 | Beshai et al. | |
| 2003/0194175 | A1 | 10/2003 | Beshai et al. | |
| 2003/0215232 | A1 * | 11/2003 | Jahn | H04J 14/02 398/41 |
| 2004/0033039 | A1 | 2/2004 | Oliveti et al. | |
| 2004/0208549 | A1 * | 10/2004 | Rutledge | H04J 14/0227 398/50 |
| 2004/0208551 | A1 * | 10/2004 | Weverka | H04J 14/0204 398/50 |
| 2005/0063700 | A1 * | 3/2005 | Shin | H04B 10/0775 398/30 |
| 2005/0089327 | A1 * | 4/2005 | Ovadia | H04L 45/04 398/47 |
| 2005/0147411 | A1 * | 7/2005 | Hamou | H04J 14/0201 398/59 |
| 2006/0036831 | A1 * | 2/2006 | Karashima | G06F 15/16 711/206 |
| 2006/0072918 | A1 | 4/2006 | Gerstel et al. | |
| 2006/0127094 | A1 | 6/2006 | Kwak | |
| 2007/0154217 | A1 * | 7/2007 | Kim | H04J 14/02 398/72 |
| 2007/0281698 | A1 * | 12/2007 | Lin | H04W 36/0094 455/436 |
| 2008/0231943 | A1 * | 9/2008 | Sorin | H04B 10/506 359/336 |
| 2011/0217038 | A1 | 9/2011 | Zhang et al. | |
| 2012/0201534 | A1 | 8/2012 | Miyashita et al. | |
| 2012/0275782 | A1 * | 11/2012 | Rapp | H04B 10/272 398/25 |
| 2012/0301141 | A1 * | 11/2012 | Sakamoto | H04J 14/0204 398/48 |
| 2013/0108215 | A1 | 5/2013 | Ticknor et al. | |
| 2013/0182566 | A1 * | 7/2013 | Goergen | H04L 1/1628 370/230 |
| 2013/0188492 | A1 * | 7/2013 | Gorgen | H04L 1/1854 370/235 |
| 2014/0161443 | A1 * | 6/2014 | Zhou | H04J 14/021 398/27 |
| 2014/0294392 | A1 * | 10/2014 | Winzer | H04J 14/0201 398/70 |
| 2015/0037035 | A1 * | 2/2015 | Sugawa | H04J 14/08 398/66 |
| 2015/0125153 | A1 * | 5/2015 | Lee | H04B 10/0793 398/79 |
| 2015/0280851 | A1 * | 10/2015 | Sarashina | H04J 14/0257 398/72 |
| 2015/0372758 | A1 * | 12/2015 | Mun | H04J 14/0245 398/135 |
| 2016/0036552 | A1 | 2/2016 | Li et al. | |
| 2016/0080104 | A1 * | 3/2016 | Nakashima | H04J 14/0257 398/79 |
| 2016/0087717 | A1 * | 3/2016 | Cavaliere | H04J 14/00 398/34 |
| 2016/0091665 | A1 * | 3/2016 | Jones | H04Q 11/0005 385/2 |
| 2016/0094308 | A1 * | 3/2016 | Liboiron-Ladouceur | H04J 14/04 398/44 |
| 2016/0099792 | A1 * | 4/2016 | Gao | H04J 14/0257 398/69 |
| 2016/0156546 | A1 * | 6/2016 | Ceccarelli | H04J 14/0295 398/52 |
| 2016/0204569 | A1 * | 7/2016 | Kuzukami | H01S 3/0014 372/20 |
| 2016/0261364 | A1 * | 9/2016 | Jiang | H04J 14/0282 |
| 2016/0276803 | A1 * | 9/2016 | Uesaka | H01S 5/06817 |
| 2016/0301496 | A1 * | 10/2016 | Eiselt | H04J 14/0227 |

OTHER PUBLICATIONS

Chiaroni, D. et al., "Packet OADMs for the Next Generation of Ring Networks," Bell Labs Technical Journal, vol. 14, Issue 4, Winter 2010, pp. 265-283.

Kachris, C. et al., "A Survey on Optical Interconnects for Data Centers," IEEE Communications Surveys & Tutorials, vol. 14, No. 4, Fourth Quarter 2012, Date of Publication: Jan. 11, 2012, pp. 1021-1036.

Kannan, Rajgopal, et al., "STWnet: A High Bandwidth Space-Time-Wavelength Multiplexed Optical Switching Network," INFOCOM 97, Sixteenth Annual Joint Conference of the IEEE Computer and Communications Societies, Driving the Information Revolution, Proceedings IEEE Kobe, Apr. 7-11, 1997, Los Alamitos, CA, vol. 2, 7, 8 pages.

* cited by examiner

SYSTEM AND METHOD FOR OPTICAL NETWORK

This application is a continuation of U.S. patent application Ser. No. 14/877,280 filed on Oct. 7, 2015, entitled "System and Method for Optical Network," which claims the benefit of U.S. Provisional Application Ser. No. 62/128,627 filed on Mar. 5, 2015, and entitled "System and Method for an Optical Interconnecting Network," which applications are hereby incorporated herein by reference in their entirety.

TECHNICAL FIELD

The present invention relates to a system and method for photonics, and, in particular, to a system and method for optical networks.

BACKGROUND

An increase in internet traffic drives an increased scale of data centers. Data centers host data intensive applications with significant interactions between the servers in the data center. As the scale of data centers increases, the interconnecting network may become complicated, expensive, and power hungry. Data center networks may have limited throughput, a high over-subscription ratio, high latency, high power consumption, a large number of interconnections, and high cost. Optical networks may increase throughput by reducing switching times. However, there is a need in the art for optical switching networks that can switch data between a large number of servers at a low cost and with low complexity.

SUMMARY

An embodiment optical circuit switching matrix includes a plurality of optical ports, each optical port being optically coupled to a respective one of a plurality of user nodes and an optical coupler having at least one input port optically coupled to the plurality of optical ports, and an output port. The optical circuit switching matrix also includes a wavelength demultiplexer having an input optically coupled to the output port of the optical coupler, and a plurality of output ports, each output port being optically coupled to a respective one of the plurality of optical ports.

An embodiment method includes receiving, by an optical circuit switching matrix from a plurality of user nodes, a plurality of input optical packet streams and combining the plurality of input optical packet streams to produce a combined optical packet stream. The method also includes switching a portion of the combined optical packet stream having a first wavelength to a first user node and switching a portion of the combined optical packet stream having a second wavelength to a second user node and transmitting, by the optical circuit switching matrix to the second user node, the first switched portion of the combined optical packet stream. Additionally, the method includes transmitting, by the optical circuit switching matrix to the second user node, the second switched portion of the combined optical packet stream.

An embodiment optical circuit switching matrix includes a plurality of optical ports, each optical port being optically coupled to a respective one of a plurality of user nodes with only one optical fiber coupling each of the user nodes to the optical circuit switching matrix and an optical coupler coupled to the plurality of optical ports, and an output port. The optical circuit switching matrix also includes a wavelength demultiplexer having an input optically coupled to the output port of the optical coupler and a plurality of output ports.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the designs and implementations illustrated and described herein, but may be modified within the scope of the appended claims along with their full scope of equivalents.

An embodiment optical network architecture has a star structured, centralized, passive, N×N optical circuit switching matrix, where N is the number of input ports and the number of output ports of the optical circuit switching matrix. Single fibers connect a central optical circuit switching node port and user nodes in a star configuration. The central optical circuit switch is a wavelength switch. In a wavelength switch, optical switches are switched to particular output ports based on wavelength. One optical fiber connection may include a pair of optical fibers with one optical fiber per direction or a single optical fiber used bi-directionally. There is one optical data channel from a user node to the central optical switching node at a time. This channel is timeslotted, and the wavelength may differ from timeslot to timeslot. One channel exists at a time from the central optical circuit switching node to the user node. This channel is timeslotted, and its wavelength is fixed. Each wavelength is received by at most one input port of the central optical circuit per timeslot. At the central optical circuit switching node, switching is performed based on wavelength, without active switching, data buffering, or optical gates. A centralized controller at the central optical circuit switching node schedules wavelength assignments in accordance with the traffic demands from user nodes via a control channel. The centralized controller also performs timeslot monitoring and synchronization among the user nodes.

Figure 1:
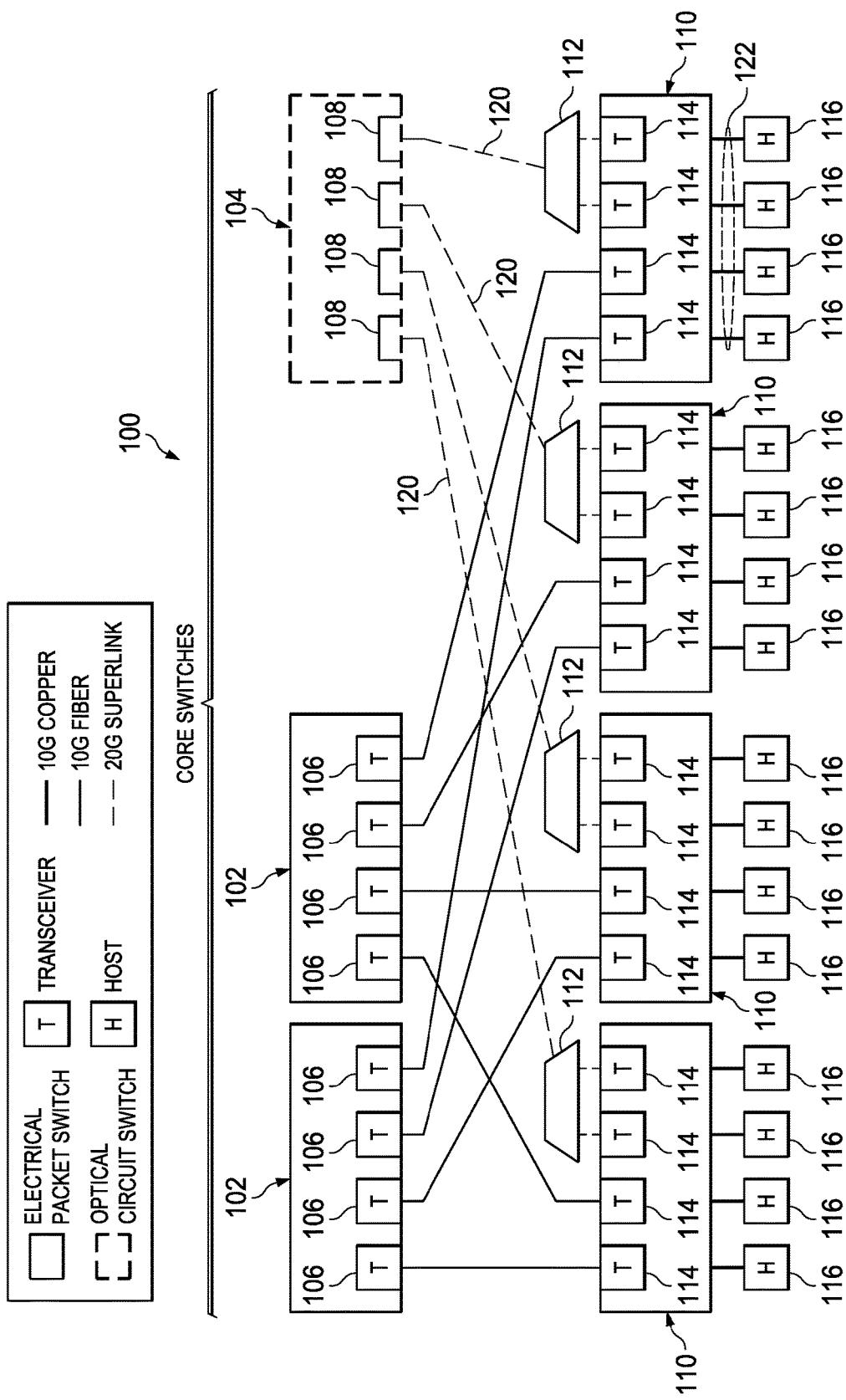
FIG. 1 illustrates a Helios architecture.

FIG. 1 illustrates a Helios data center network 100. A Helios data center uses a 2-layer data center network architecture. Transceivers 106 of electrical packet switches 102 are coupled to transceivers 114 of pods 110, also known as pod switches or top-of-rack (ToR) switches, via 10G fiber 118. Some transceivers 114 of pods 110 are coupled to multiplexers (Muxes) 112, which are coupled to transceivers 108 of optical circuit switch 104 via 20G superlinks 120. Superlinks 120 can carry up to w×10 Gbps, where w is the number of wavelengths, for example between 1 and 32. Also, pods 110 are coupled to hosts 116 via 10G copper links 122. The Helios architecture may have a slow mechanical switching time, for example greater than 10 ms, which might be suitable for long bursts of traffic.

Figure 2:
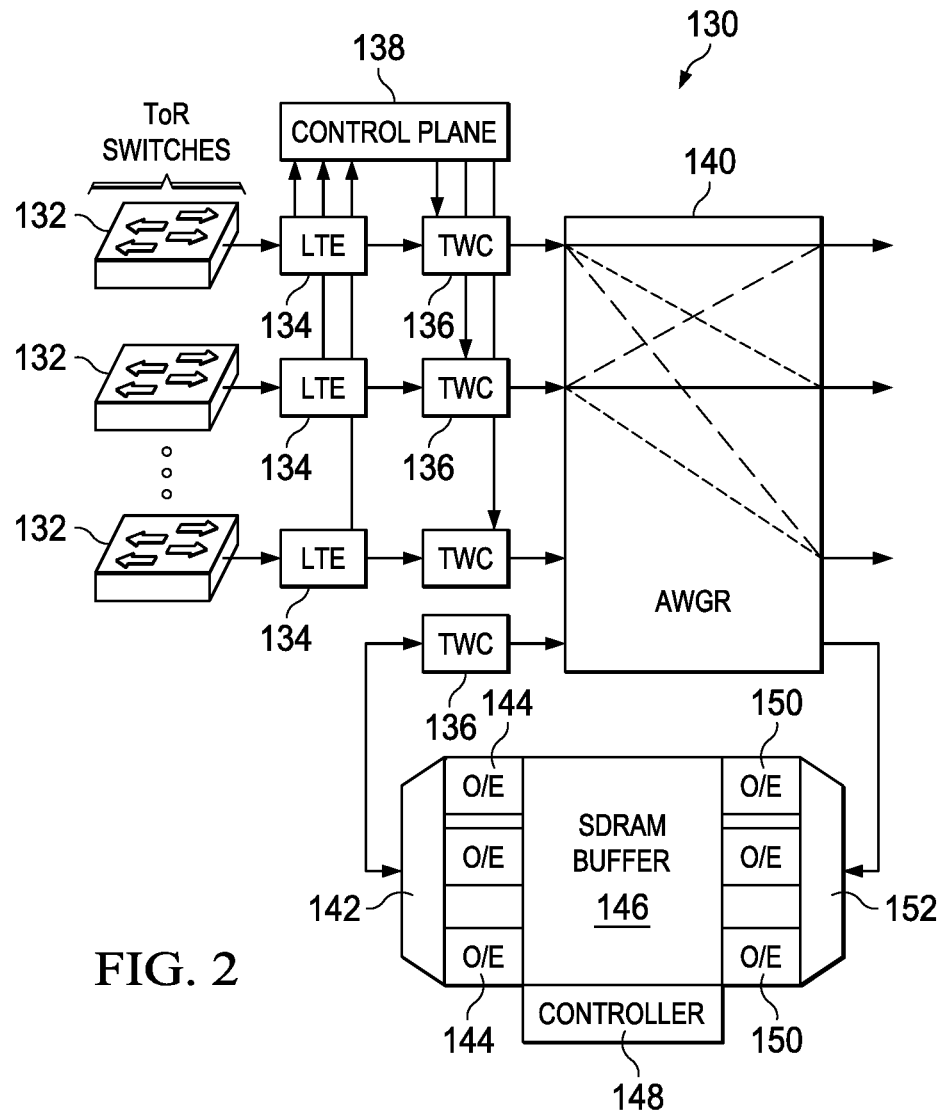
FIG. 2 illustrates a datacenter optical switch (DOS)

FIG. 2 illustrates a datacenter optical switch (DOS) 130. DOS 130, which is based on arrayed waveguide grating (AWGR) 140, has contention resolution in the wavelength domain. An array of tunable wavelength converters (TWCs) 136 is coupled to AWGR 140. The nodes can access other nodes through AWGR 140 by tuning the transmission wavelength. ToR switches 132 transmit packets to label extractors (LEs) 134. Control plane 138 controls TWCs 136 and LEs 134. LEs 134 read the labels of the packets, which may include the destination address and packet length, and the label information is sent to control plane 138. Control plane 138 then selects the appropriate wavelength from TWCs 136 based on the extracted label information. Synchronous dynamic random access memory (SDRAM) buffer 146 is used to store transmitted packets. The packets are demultiplexed by demultiplexer 152 and converted to the electrical domain from the optical domain by optical-to-electrical (O/E) converters 150 for storage in SDRAM buffer 146. Controller 148 receives requests for buffered packets, which are retrieved from SDRAM buffer 146, converted to optical signals by optical-to-electrical (O/E) converters 144, and multiplexed by multiplexer 142, to be switched by AWGR 140.

Figure 3:
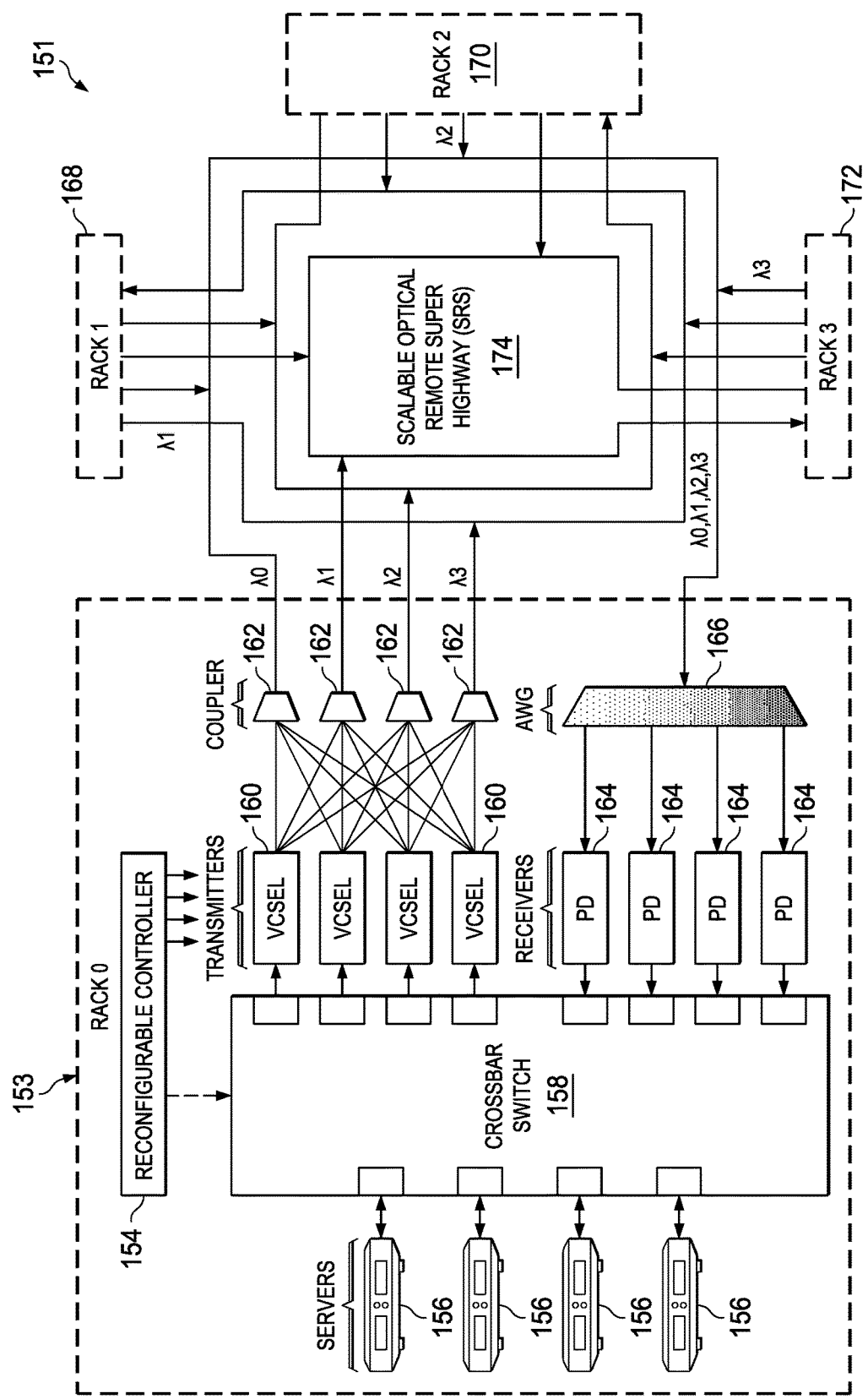
FIG. 3 illustrates an E-Rapid architecture.

FIG. 3 illustrates Extended Reconfigurable All Photonic Interconnect for Distributed and parallel systems (E-RAPID) architecture 151. The racks, including racks 153, 168, 170, and 172, host servers 156 and vertical cavity surface emitting lasers (VCSELs) 160. Reconfigurable controller 154 is used to control crossbar switch 158 and to allocate servers 156 to VCSELs 160. Only one VCSEL is active at a particular wavelength at a time. Couplers 162 are coupled to VCSELs 160, with one coupler for each wavelength to select the VCSEL that will forward the packet to scalable optical remote super highway (SRS) 174. SRS 174 includes several optical rings, one SRS for each rack, and one ring per wavelength. In the receiver path, AWGR 166 is used for demultiplexing the wavelengths routed to an array of photodiode (PD) receivers 164. Crossbar switch 158 is used to forward the packets from each receiver to the appropriate node in the board.

Figure 4:
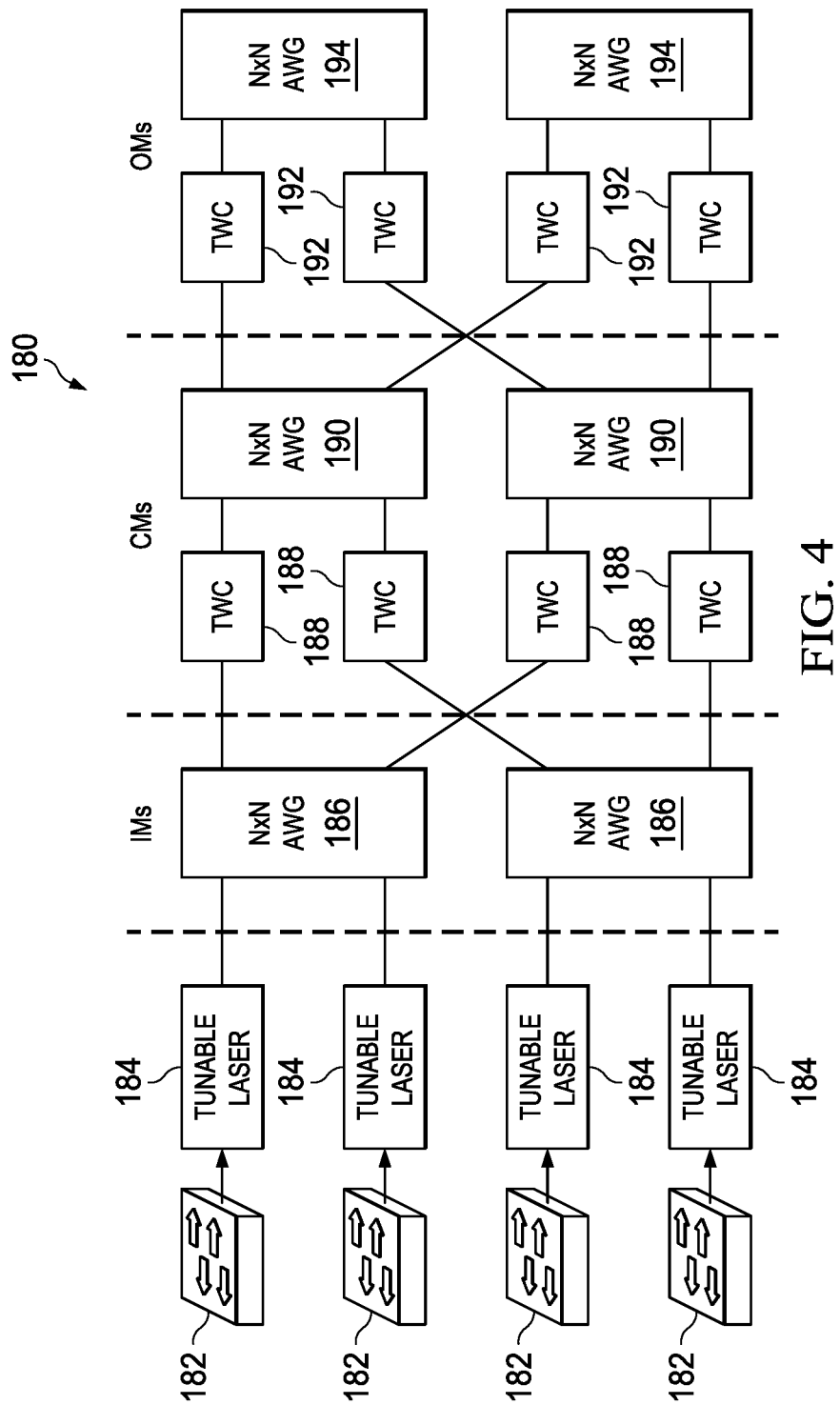
FIG. 4 illustrates a petabit switch.

FIG. 4 illustrates petabit optical switch 180 which is based on AWGRs and TWCs in a three-stage Clos network. ToR switches 182 are coupled to tunable lasers 184. The input modules (IMs) include N×N AWGRs 186. The tunable lasers transmit the packets at particular wavelengths, and the wavelengths of the packers are used to route the packets. Central modules (CMs) include TWCs 188 and AWGRs 190 Output modules (OMs) include TWCs 192 and AWGRs 194. Congestion management is performed using electronic buffers in line cards and an efficient scheduling algorithm. Each line card that is connected to the input port of the Petabit switch hosts a buffer in which the packets are stored before transmission. The packets are classified to different virtual output queues (VOQs) based on the destination address. One VOQ is maintained per OM. The scheduler is used to find a bipartite match from the input port to the output port and to assign a CM for each match.

Figure 5:
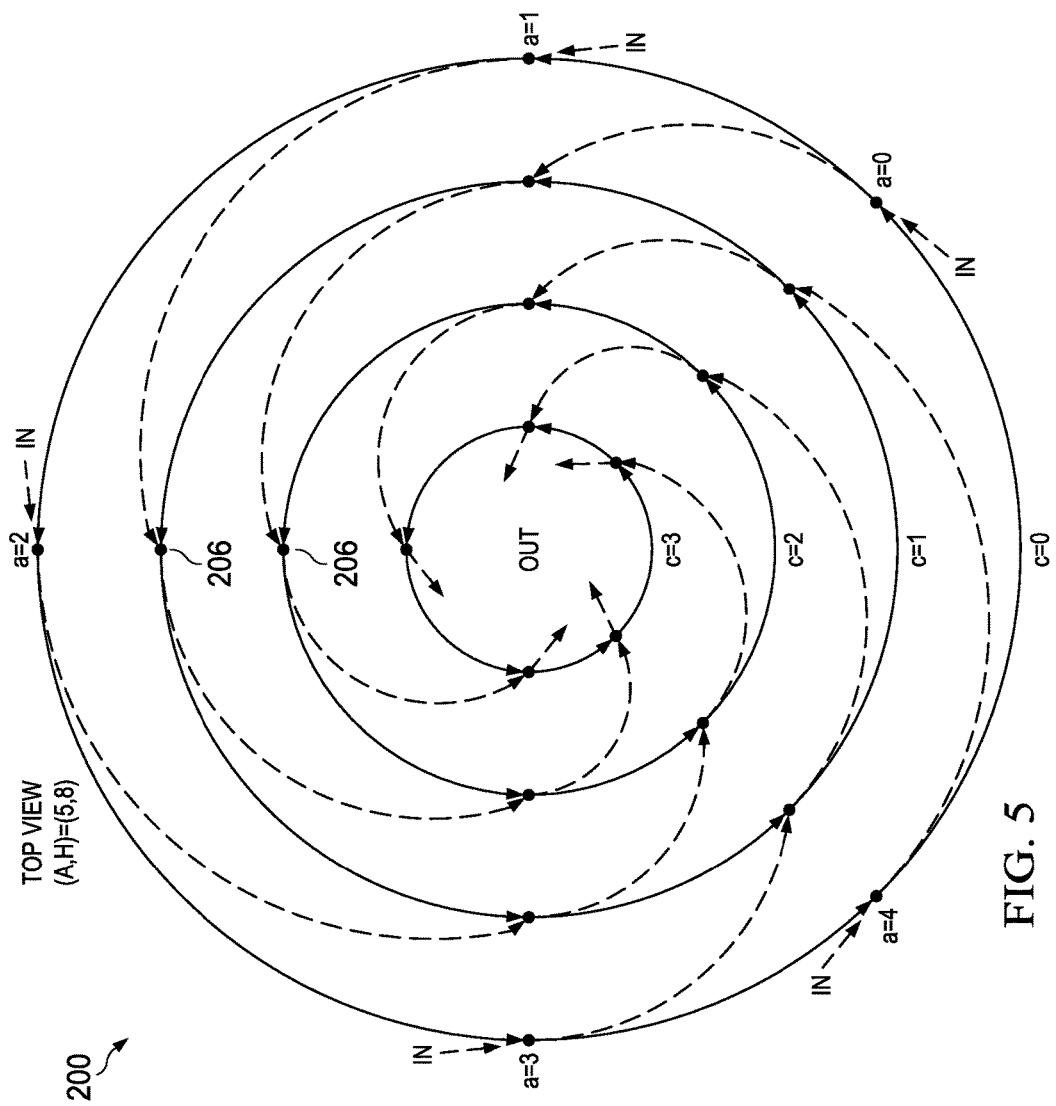
FIG. 5 illustrates a data vortex.

FIG. 5 illustrates data vortex 200 which includes nodes 206 which can route both packet and circuit switched traffic simultaneously in a configurable manner based on semiconductor optical amplifiers (SOAs). The SOAs are organized in a gate-array configuration and serve as photonic switching elements. The data vortex topology is composed of 2×2 switching elements arranged in a fully connected directed graph with terminal symmetry. The single packet routing nodes are wholly distributed without centralized arbitration. The topology is divided into hierarchies or cylinders.

Figure 6:
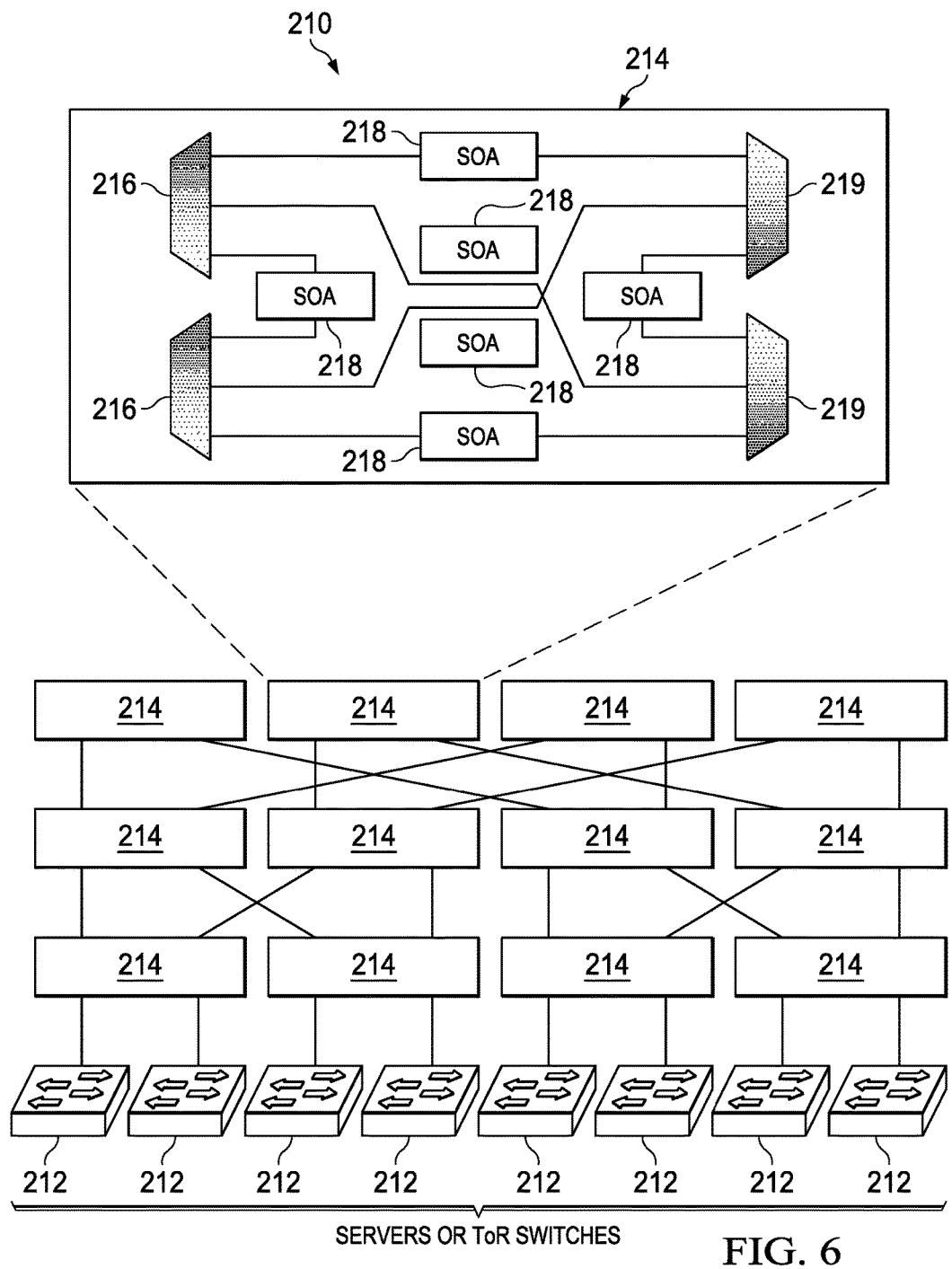
FIG. 6 illustrates a bi-directional photonic network.

FIG. 6 illustrates switching structure 210, which is based on 2×2 switches form SOAs. Nodes 212 may be blade servers or ToR switches. Switches 214 are disposed in a Banyan network. Each switch 214 includes six SOAs 218, two demultiplexers 216, and two multiplexers 219. Each port can establish a connection with any of the other ports.

Figure 7:
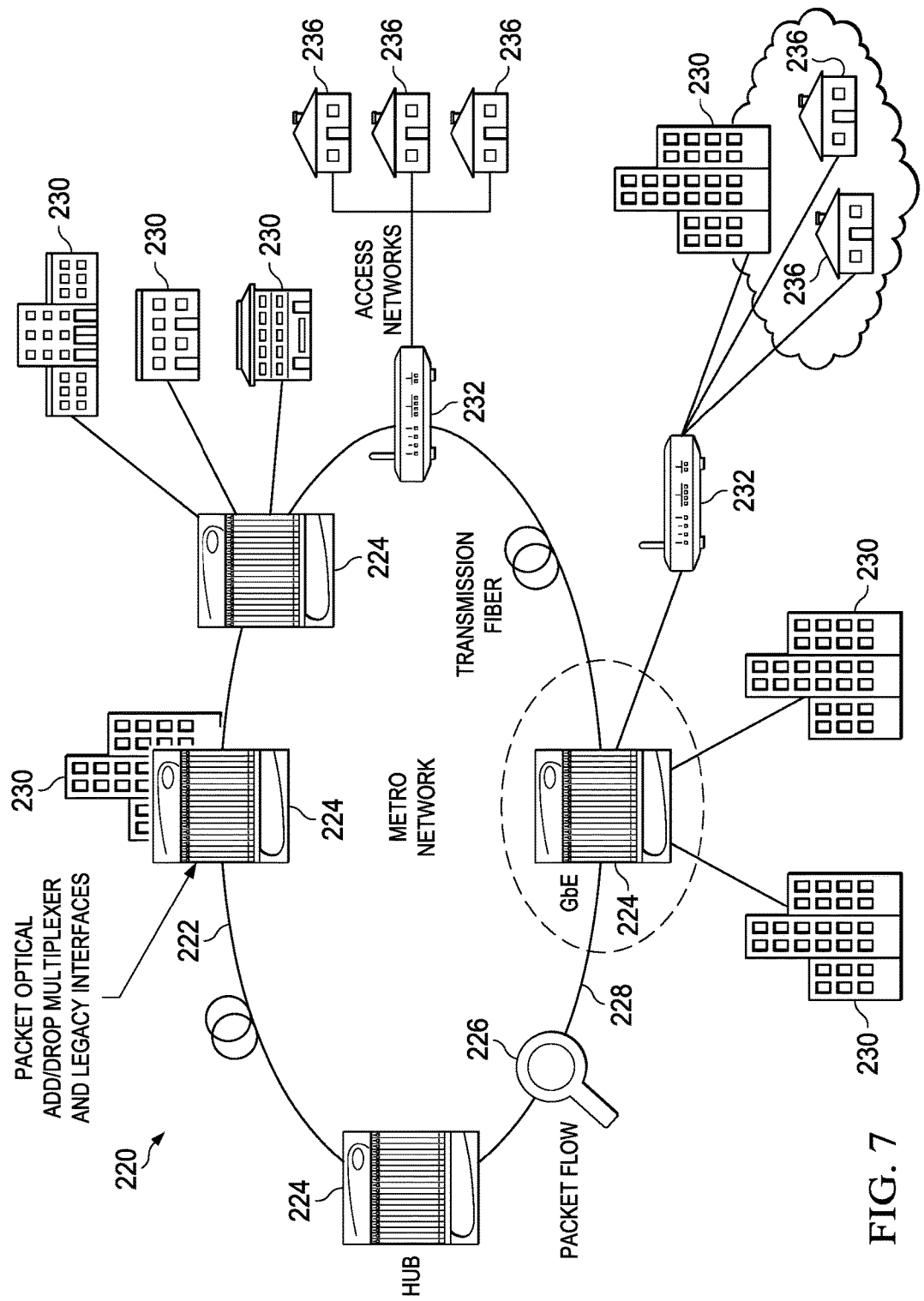
FIG. 7 illustrates optical slot switching.

FIG. 7 illustrates packet ring network 220 with packet optical add/drop multiplexer (POADM) based ring nodes. Hubs 224 are configured in a ring connected by transmission fiber 222. The ring may also include packet flow monitor 226 and routers 232. Hubs and routers are connected to businesses 230 and homes 236. Connections may include gigabit Ethernet (GbE) 228. Packets may be processed at a drop level, a transit level, and an add level. In this ring structure, there is no central switching node, and switching decisions are made at each node. Fast optical gates, optical amplification, and filtering are used at each node.

Figure 8:
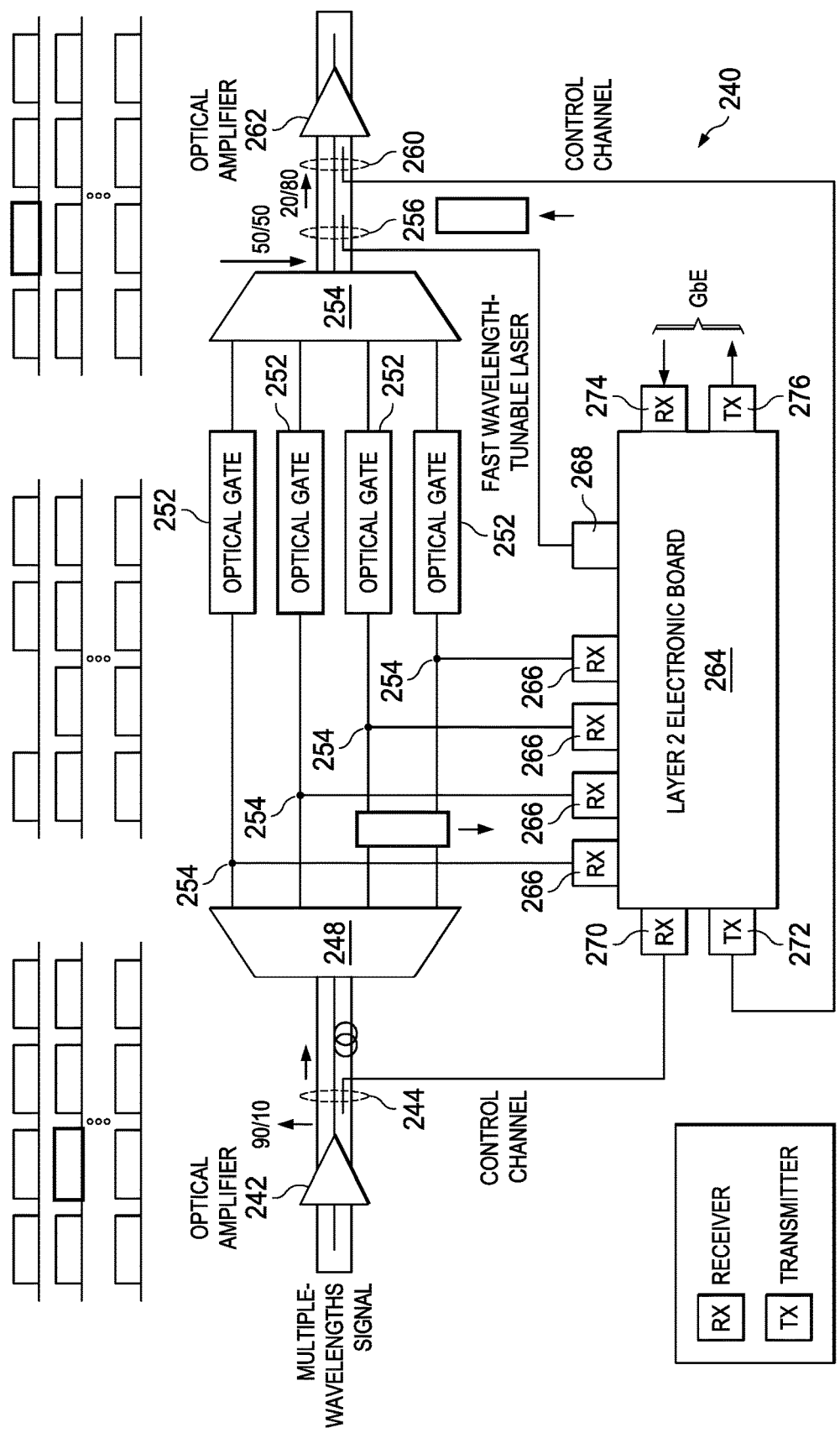
FIG. 8 illustrates a packet optical add/drop multiplexer (POADM) structure.

FIG. 8 illustrates POADM structure 240. Optical amplifiers 242 and 262 at the input and output manage the power budget and enable the cascading of multiple nodes. Optical demultiplexer 248 performs demultiplexing. Optical multiplexer 254 performs multiplexing. One optical gate 252 per wavelength performs amplification, real-time packet management, and fast packet power equalization. Optical couplers 244, 256, and 260 extract and re-insert control packets for dropping and adding packets. Demultiplexer 248 extracts particular wavelengths. Layer 2 electronic control board 264, which contains receivers 270, 266, and 274, transmitters 272 and 276, controls fast wavelength tunable laser 268.

Figure 9:
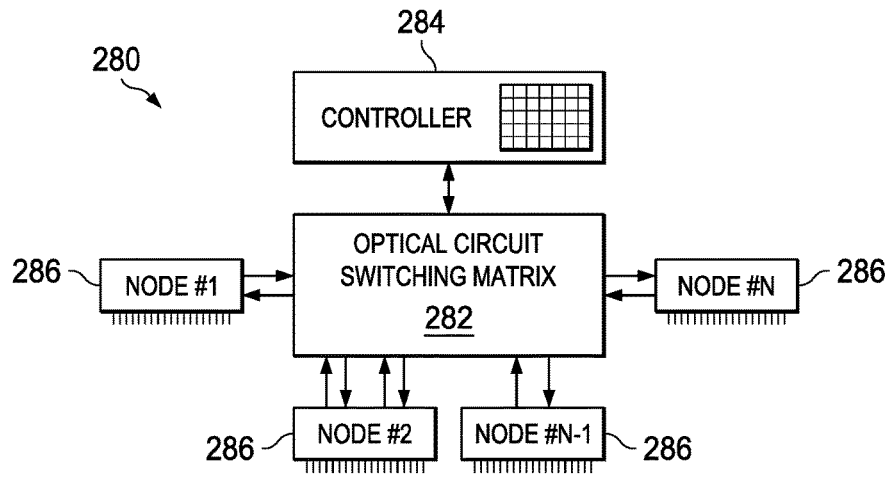
FIG. 9 illustrates an embodiment optical circuit switching system.

FIG. 9 illustrates embodiment optical circuit switching architecture 280. At the center of the optical circuit switching architecture 280 is optical circuit switching (OCS) matrix 282, a centralized, N×N passive optical circuit switching matrix, with N input ports and N output ports. Optical circuit switching matrix 282 is an optical circuit switch which directs signals along paths based on wavelength. Timeslotted packets from the nodes are wavelength switched. For example, optical circuit switching matrix 282 may include a coupler followed by a wavelength demultiplexer or an AWGR.

Optical circuit switching matrix 282 is coupled to N user nodes 286 in a star configuration, with two-way optical connections between a port of each user node and a port of the optical circuit switching matrix 282. N may be, for example, 32, 64, or 128. Each optical connection may be a pair of optical fibers, each carrying optical signals in one direction, or a single fiber used bi-directionally. Timeslotted optical packets are received from the user nodes 286. The optical packet streams from all of the user nodes are scheduled so that at most one user node per timeslot transmits at each wavelength. The timeslotted optical packets are wavelength switched. Then, the switched optical packets, which are timeslotted at a fixed wavelength for each user node, are transmitted to the destination user node. Each user node is associated with a particular receiving wavelength. There is a bidirectional, out-of-band control channel for each connection between each user node and optical circuit switching matrix 282. The control channel may be a dedicated control channel.

Controller 284, which is coupled to optical circuit switching matrix 282, is used for wavelength assignment and timeslot synchronization. Packets are stored in a buffer, which may buffer data for about 1 µs, at the user node. User traffic is addressed to one of N−1 directions, where N is the number of nodes. The user traffic is buffered in the electronic domain before transmission to align transmission timeslots between the user nodes and thereby avoid wavelength contention.

Figure 10:
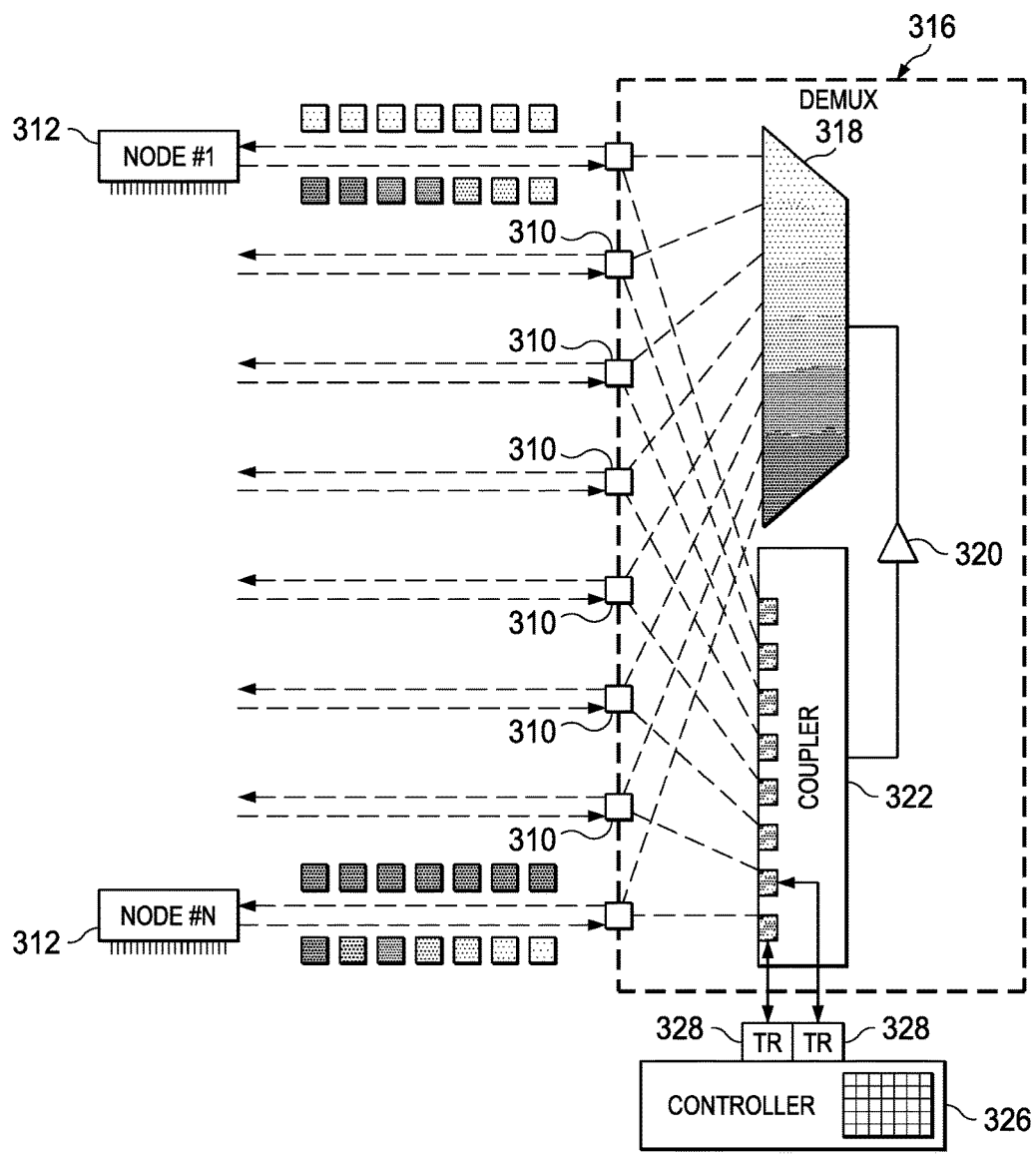
FIG. 10 illustrates another embodiment optical circuit switch with a centralized controller.

FIG. 10 illustrates an example of a wavelength switched optical circuit switching matrix 316. User nodes 312 transmit optical packet streams to the optical circuit switching matrix 316. Each input optical packet from a user node is addressed by being transmitted at a particular wavelength that corresponds to the destination address of the packet. User nodes 312 also transmit optical control packets to optical circuit switching matrix 316. An optical control packet stream may be on a dedicated control wavelength. There is a bi-directional out-of-band (OOB) control channel for each user node. In one example, the optical control packet stream includes a request for an optical packet to be switched to a particular output port of optical circuit switching matrix 316. Then, the controller assigns timeslots to the optical packets to avoid collisions. Optical splitters/combiners 310 direct the optical packet streams to coupler 322. Coupler 322 may be a passive optical device. Wavelength division multiplexer (WDM) demultiplexers 324 of coupler 322 direct the optical control streams to transceivers 328 of controller 326. There is an optical control stream for each node. WDM demultiplexers 324 also direct a portion of the light from the optical packet streams to controller 326 for timeslot synchronization.

The OOB control channel from a user node to the switching node is separated by a WDM demultiplexer at the coupler input, and the control signal is received by the OOB receiver. The control signal does not enter the coupler. A timeslot assignment is transmitted in an OOB control channel from the switching node to the user node. The OOB control channel is added for transmission to the user node in the same optical fibers as the switched optical packet streams.

Controller 326 performs centralized control, for example by coordinating the wavelength and timeslot assignments. Controller 326 allocates timeslots to optical packets on particular wavelengths, so there is only one user node transmitting at a particular wavelength per timeslot. Also, controller 326 performs timeslot synchronization to synchronize the arrival of the input packets at the optical circuit switching matrix 316. Transceivers 328 of controller 326 transmit control information to coupler 322. The control information includes the wavelength and timeslot allocated to the nodes, and timeslot corrections.

Controller 326 also determines the timing of the timeslots, so timeslots from the user nodes are synchronized at the optical switch. When a timeslot is out of synchronization, the controller transmits a control signal to optical circuit switching matrix 316, destined for the out-of-synchronization user node, to correct the timing of the timeslots in that user node. Transceivers 328 of coupler 322 transmit the control information to user nodes 312. The control information may be transmitted on a dedicated control wavelength. The user node later begins transmission of the optical packet in the allocated timeslot at the allocated wavelength. The data for transmission is obtained from the correct buffer in the VOQ, placed into optical packets, and transmitted.

Coupler combines the input packet streams from the user nodes into a combined optical packet stream.

The combined optical packet stream is amplified by optical amplifier 320 to compensate for loss. Optical amplifier 320 may be a semiconductor optical amplifier (SOA) or an erbium doped fiber amplifier (EDFA).

The optical packet stream is WDM demultiplexed by demultiplexer 318. Demultiplexer 318 may be a passive optical device. The optical packet streams are separated based on their wavelength, so that all of the packets that are transmitted at a particular wavelength are routed to the same output port as a separate output optical packet stream for the user node that corresponds to the particular wavelength. These switched optical packet streams are propagated to fiber connectors 310, which direct the packet streams to user nodes 312.

Figure 11:
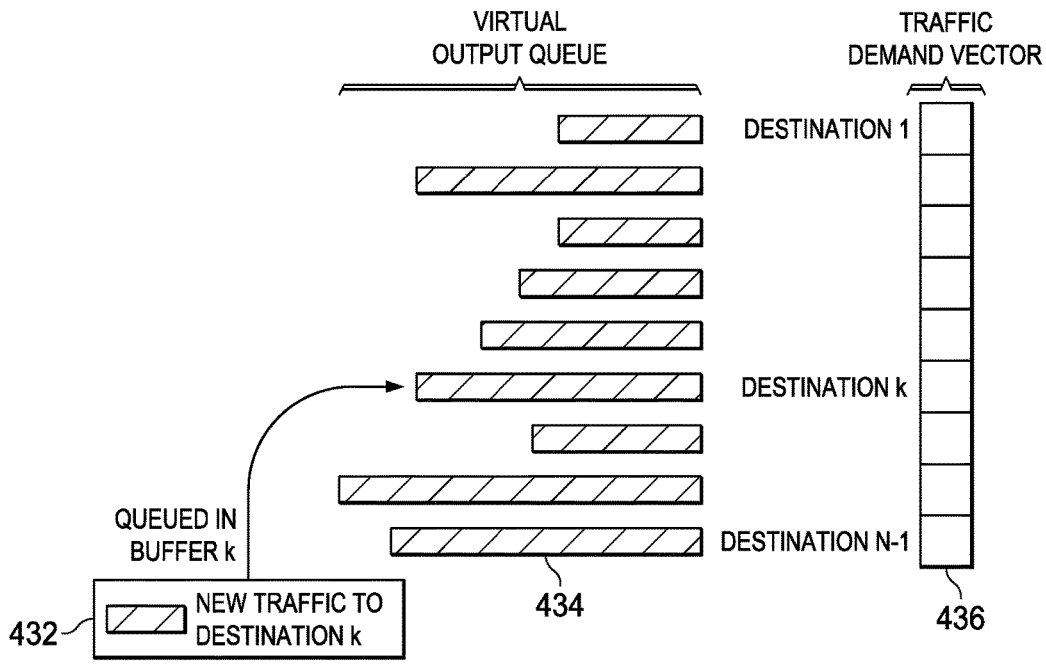
FIG. 11 illustrates an embodiment scheduler.

FIG. 11 illustrates an example of scheduling. The user traffic is buffered and queued based on the destination. There are N−1 buffers, each for one destination, in the virtual output queue. The user node also stores a traffic demand vector 436, which tracks the sizes of the buffers. This traffic demand vector 436 is transmitted to the central controller by its control channel. The central controller receives the traffic demand vector 436 from every node and maintains a traffic demand matrix. Scheduling is done based on the traffic demand matrix. New traffic 432 to destination k is queued in buffer k in virtual output queue module 434, which contains N-1 queues. The data is then placed in the destination k portion of the virtual output queue. The data is stored in the buffer, and is extracted from the buffer for transmission.

Figures 12, 13:
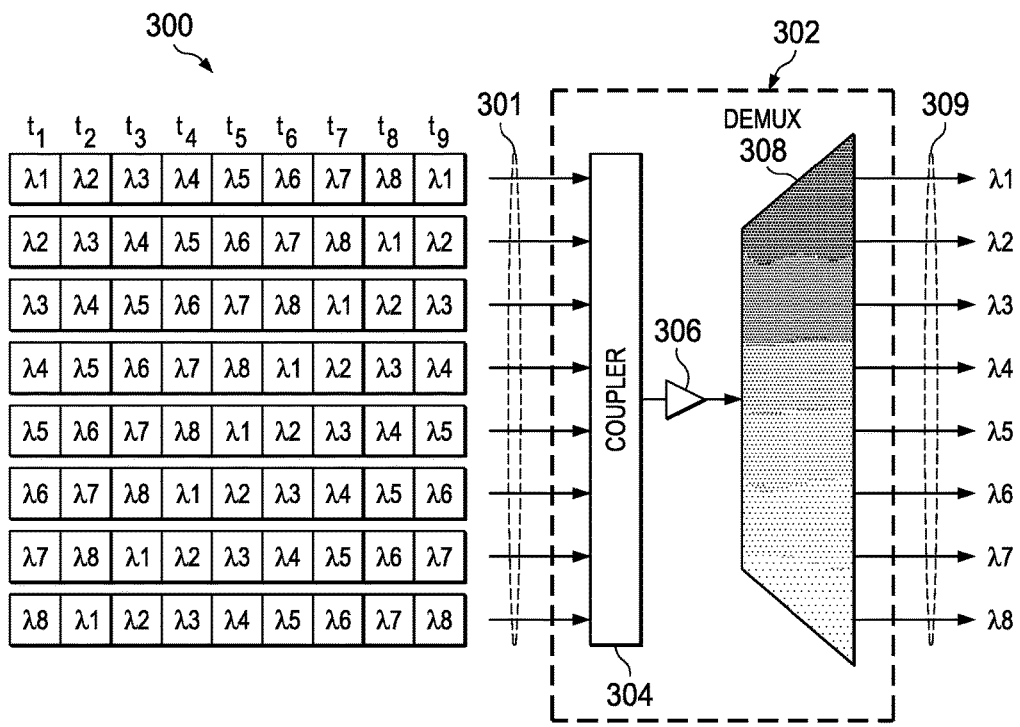
FIG. 12 illustrates an embodiment traffic demand matrix (TDM)
FIG. 13 illustrates an embodiment optical circuit switch.

FIG. 12 illustrates traffic demand matrix (TDM) 440. Traffic demand requests are transmitted to controller 284 from each transmission port, and the TDM 440 is updated every timeslot. For 80 wavelengths, with two bytes per wavelength, 160 bytes, or 1280 bits, of control information must be transmitted per timeslot. In the example of a 2 μs timeslot, the bandwidth requirement for control information is 1280 bits/2 μs=640 Mbps. The scheduler determines the transmission timeslot based on the TDM 440. Controller 284 receives connection requests from optical circuit switching matrix 282 originating from user nodes 286. Then, controller 284 allocates a timeslot to each packet based on connection requests received from the user nodes, so that each user node receives at most one packet per timeslot, and therefore each wavelength is used at most once per timeslot. Controller 284 monitors the slot misalignment of the timeslots, and may direct the user node transmitter to adjust the slot timing so that the different wavelengths arrive at the optical circuit switching matrix at the same time.

FIG. 13 illustrates wavelength switching architecture 300. Wavelength switching architecture 300 may, for example, be used in optical circuit switching matrix 282, illustrated in FIG. 9. Optical switching node 302 in wavelength switching architecture 300 includes coupler 304, optical amplifier 306, and WDM demultiplexer 308.

Input ports 301 receive colorless optical inputs from the user nodes. Input optical packet streams are received from the user nodes. The optical packets from all the user nodes are synchronized to arrive at the optical circuit switching matrix 282 in predetermined timeslots. Each packet arriving in the same timeslot has a different wavelength. Different packets in a given input packet stream which arrive in different timeslots may have different wavelengths, corresponding to their different destination addresses. The wavelength of each packet ensures that the packet is switched to the output port of optical switching node 302 corresponding to the intended destination of that optical packet. In one example, the wavelength source is a tunable laser, such as a sample grating distributed Bragg Reflector (SG-DBR) laser, an external cavity laser using a micro-electro-mechanical system (MEMS) structure for tuning the cavity length, an external cavity laser using a multiple-prism grating arrangement, a distributed feedback (DFB) laser array based on thermal tuned DFB lasers, or a tunable VCSEL. In another example, the wavelength source is a fast wavelength optical switch which selects a desired wavelength from a multi-wavelength laser source. The output from the optical transmitter is timeslotted, and the timeslots of the user nodes are synchronized when they reach the switching matrix.

Coupler 304 is a passive element that receives optical packet streams from the optical transmitters in the user nodes, and combines the received optical packet streams into a single optical packet stream.

The combined optical stream is amplified by optical amplifier 306 to compensate for transmission losses. Optical amplifier 306 may be a semiconductor optical amplifier (SOA) or a doped fiber amplifier (DFA), such as an Erbium doped fiber amplifier (EDFA).

Demultiplexer 308 is a passive optical device that WDM demultiplexes the combined optical packet stream and sends each wavelength to a corresponding output port. In some examples, the optical amplification occurs after the demultiplexing, so single wavelength amplification may be used. In other examples, optical amplification is not used.

Figure 14:
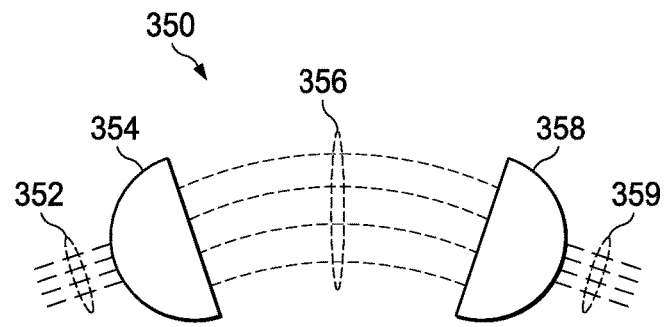
FIG. 14 illustrates an embodiment arrayed waveguide grating router (AWGR)

In another example, the optical switching node is an AWGR. FIG. 14 illustrates AWGR 350. The input optical signals with different wavelengths are received in inputs 352. The input optical signals traverse free space region 354, where light diffracts out of the input waveguides at the coupler/slab interface and propagates through free space region 354.

Light then enters diffraction region 356. In diffraction region 356, the light undergoes a wavelength dependent change of phase from the length increment of the grating waveguides. Light diffracted from each waveguide of the grating constructively interferes with itself.

In free space region 358, the light is refocused to output waveguides 359, for example using lenses. Each output waveguide receives a different wavelength of light.

Figure 15:
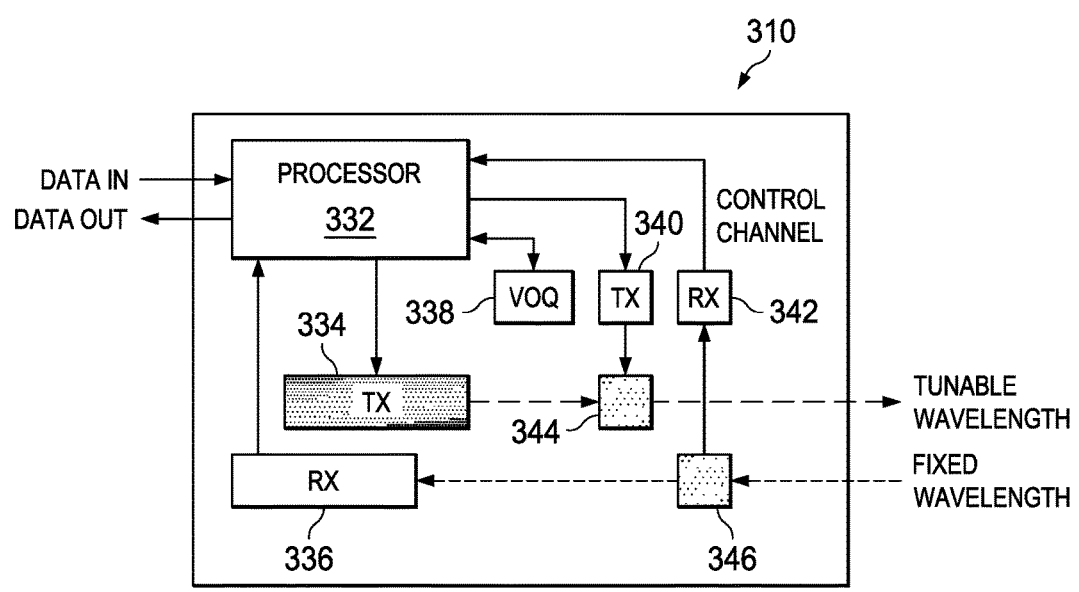
FIG. 15 illustrates an embodiment user node.

FIG. 15 illustrates user node 310. User node 310 includes processor 332, which is coupled to transmitters 334 and 340, receivers 336 and 342, and buffer 338. Input data for transmission to another user node 310 is received by processor 332, which processes the input data and stores the data in buffer 338, a virtual output queue (VOQ). Data is stored in the data buffer in the electronic domain, while awaiting conversion to the optical domain and transmission to the optical circuit switching node for switching.

Processor 332 transmits a connection request to the controller 326 based on the destination address of the data stored in the buffer 338. The connection request is converted from the electrical domain to the optical domain by control transmitter 340. The control transmitter has a fixed wavelength which is dedicated for control information. The connection request is combined with the optical data stream by WDM multiplexer 344, and is transmitted to the optical circuit switching matrix. The control channel is an out-of-band channel that uses a wavelength not used for the data channel.

The controller 326 allocates a timeslot for the connection request, and transmits a connection response to user node 310 identifying the allocated timeslot. The connection response is received by WDM demultiplexer 346, and sent to control receiver 342. The connection response may be on a dedicated control wavelength which is not used for data transmission. In one example, the same control wavelength is used for the bidirectional control signals, i.e. the connection request and connection response. Alternatively, the connection response is on a different wavelength than the connection request. The connection response is converted from the optical domain to the electrical domain by control channel receiver 342, and sent to processor 332.

In preparation for data packet transmission, the data packet is read out from buffer 338 by processor 332. Then, the data is sent to data transmitter 334. Data transmitter 334 is a fast wavelength tunable source, such as a tunable laser or a wavelength selector. In one example, the wavelength source is a tunable laser, such as a SG-DBR laser, an external cavity laser using a MEMS structure for tuning the cavity length, an external cavity laser using a multiple-prism grating arrangement, a DFB laser array based on thermal tuned DFB lasers, or a tunable VCSEL. In another example, the wavelength source is a fast wavelength optical switch which selects the desired wavelength from a multi-wavelength laser source. The fast tunable wavelength source is able to transmit packets at different wavelengths during different timeslots. The wavelength used to transmit a packet indicates the output port of the optical circuit switching matrix to which the packet will be directed. The optical data packet is transmitted on the selected wavelength so that it arrives at the optical circuit switching matrix during the selected timeslot. WDM multiplexer 344 combines the optical data packet stream with control requests for transmission to the optical circuit switching node.

Optical data received at the user node 310 is sent to data receiver 336 by WDM demultiplexer 346. The optical data is received by the user node at the fixed wavelength allocated for data destined to this user node. Data receiver 336 is a slot or burst mode optical receiver which detects the data received at the allocated wavelength. The data is converted from the optical domain to the electrical domain by data receiver 336, and is sent to processor 332. Processor 332 may perform processing on the data. Finally, processor 332 transmits the data to other locations in the user node.

An embodiment may include non-transitory memory, such as static random access memory (SRAM), dynamic random access memory (DRAM), synchronous DRAM (SDRAM), read-only memory (ROM), or a combination thereof, for use in program storage and execution by the processor, and data storage and processing by the processor.

Figure 16:
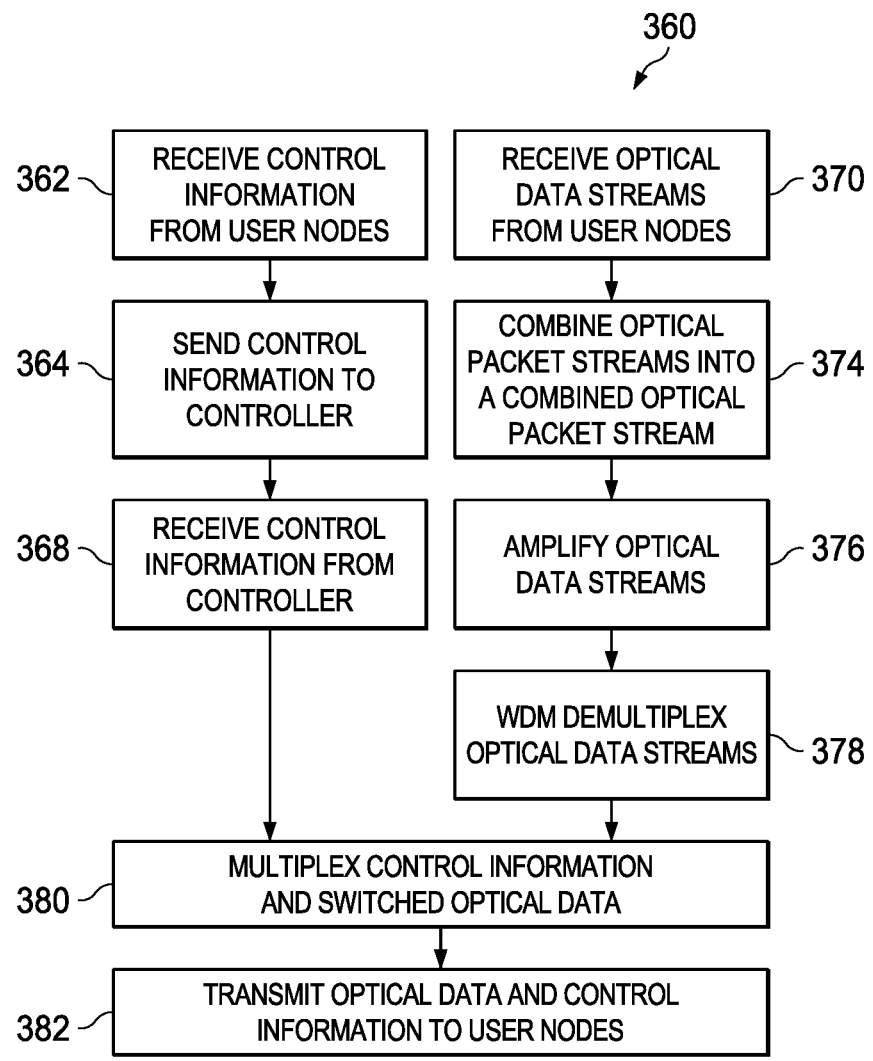
FIG. 16 illustrates a flowchart for an embodiment method of optical switching performed by an optical circuit switching matrix.

FIG. 16 illustrates flowchart 360 for an embodiment method of optical switching performed by an optical circuit switching matrix. In step 362, the optical circuit switching matrix receives control information from a user node. The optical switch may simultaneously receive control information from multiple user nodes. The control information is sent to transceivers of the coupler.

Next, in step 364, the control information is sent to a controller. The control information is converted from the optical domain to the electrical domain by a transceiver of the coupler. Then, the electrical control information is transmitted to transceivers of the controller. Information regarding the optical data streams may also be transmitted to the controller. In one example, step 364 is performed in a coupler of the optical switching matrix. Alternatively, step 364 is performed by a standalone device.

The optical circuit switching matrix receives control information from the controller in step 368. The control information is transmitted in the electrical domain from a controller transceiver to a coupler transceiver. The control signal is then converted from the electrical domain to the optical domain for transmission to the user nodes. The control signal may be transmitted on a dedicated control wavelength, which may be the same as the wavelength on which control information was received from the user nodes. In one example, the control information is converted from the electrical domain to the optical domain in a coupler in the optical switching matrix. In another example, the control information is converted from the electrical domain to the optical domain by a standalone electrical-to-optical converter.

In step 370, the optical switch receives optical data streams from the user nodes. The optical circuit switching matrix receives one optical data stream from each user node.

Then, in step 374, the optical switching matrix combines the optical packet streams into a combined optical packet stream. The timeslots of the optical streams are aligned to avoid the overlap of optical packets which are switched to the same output port.

Next, in step 376, the combined optical packet stream is amplified to compensate for power loss. The amplification may be performed using an SOA or an EDFA.

In step 378, the amplified combined optical packet stream is WDM demultiplexed. The optical data is separated by wavelength, and each wavelength is associated with a particular output port of the optical circuit switching matrix. In one example, the optical packets in each wavelength are directed to a multiplexer associated with that user node, where they are multiplexed with the control channel. Alternatively, the optical packets in each wavelength are directly sent to the user node.

In step 380, the control information and optical data stream for particular user nodes are multiplexed. This is performed separately for each user node. For each user node, the optical data is transmitted on one wavelength, and the control information is on another wavelength.

Then, in step 382, the optical data stream and control information are optically transmitted to the user nodes. There may be a single optical connection between each node and the optical circuit switching matrix. The single optical connection may be two optical fibers, one for each direction, or a single bi-directional optical fiber.

In some embodiments, the optical switching matrix only switches the optical data streams, and does not process the control information. For example, the controller may directly communicate with the user nodes.

Figure 17:
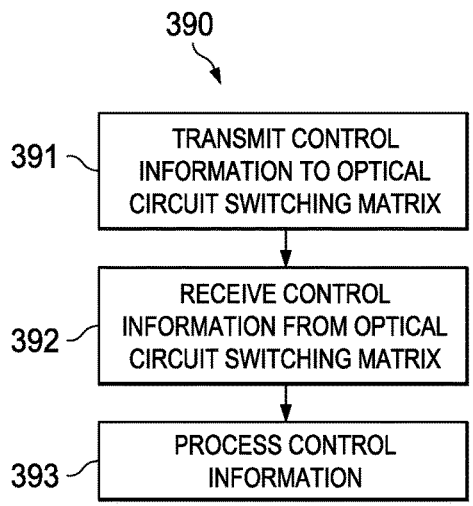
FIG. 17 illustrates a flowchart for an embodiment method of optical control performed by a user node.

FIG. 17 illustrates flowchart 390 for an embodiment method of optical control performed by a user node. In step 391, the user node transmits control information to the optical circuit switching matrix. The control information is extracted from the received data, for example from a header of the received data packet. The control information may indicate a destination address for the data packet. The user node may also perform some processing. The control information is converted from the electrical domain to the optical domain by a control transmitter, which may be a single wavelength laser which transmits at a control wavelength. The control information is WDM multiplexed with the optical data stream, and transmitted to the optical switch.

In step 392, the user node receives a control response from the optical circuit switching matrix. The control response is separated from received optical data stream using WDM demultiplexing, and sent to a control receiver. The control response may be received on a dedicated control wavelength. The control information is converted to the electrical domain from the optical domain by a control receiver.

In step 393, the control information is processed. The control information includes scheduling information for the data to be transmitted. The control information may also include a timing correction, which may be used to adjust the timing of the data transmissions from the user nodes so their arrival at the optical circuit switching matrix is aligned with predetermined timeslots.

Figure 18:
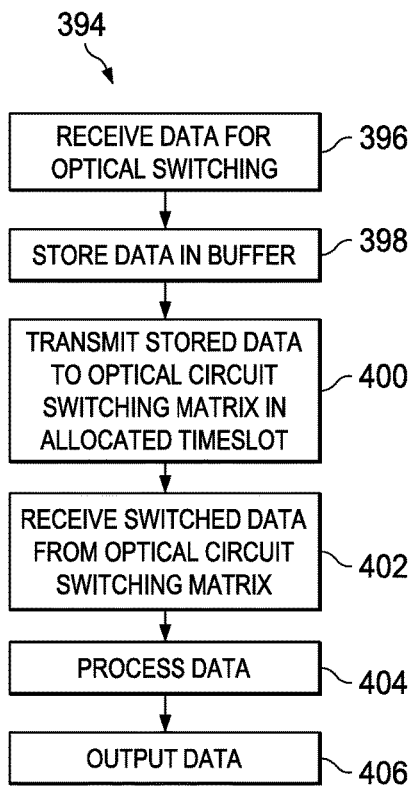
FIG. 18 illustrates a flowchart for an embodiment method of optical switching performed by a user node.

FIG. 18 illustrates flowchart 394 for an embodiment method of optical switching performed by a user node. The optical switching method of flowchart 394 may occur concurrently with the optical control process illustrated by flowchart 390. Initially, in step 396, the user node receives data for optical switching. Then, in step 398, the user node stores the received data in a data buffer, which may be a VOQ. The data is stored in the buffer awaiting an allocated timeslot for transmission to the optical circuit switching matrix.

Then, in step 400, the data stored in the data buffer is transmitted during the allocated timeslot. The data is converted to the optical domain by a data transmitter, which is a tunable wavelength source. The data is encoded on a particular wavelength corresponding to the destination user node. In one example, the wavelength source is a tunable laser, such as a SG-DBR laser, external cavity lasers using a MEMS structure for tuning the cavity length, external cavity lasers using multiple-prism grating arrangements, a DFB laser array based on thermal tuned DFB lasers, or a tunable VCSEL. In another example, the wavelength source is a fast wavelength optical switch which selects the chosen wavelength from a wideband laser source. The optical data is WDM multiplexed with control information, and transmitted to the optical circuit switching matrix.

In step 402, the user node receives switched optical data from the optical circuit switching matrix, on the wavelength associated with the user node. The switched data is WDM demultiplexed from control data, and converted to the electrical domain by a data receiver.

In step 404, the user node processes the received data.

In step 406, the user node outputs the processed data.

Figure 19:
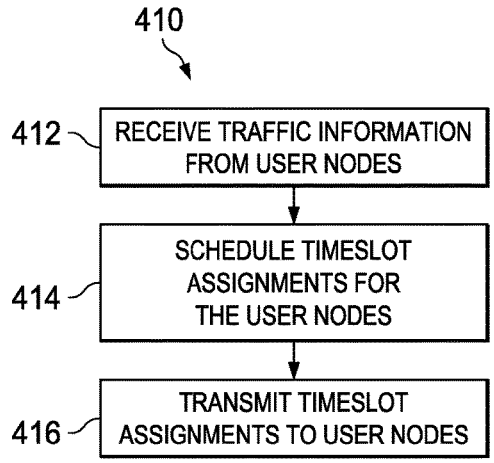
FIG. 19 illustrates a flowchart for an embodiment method of optical control performed by a centralized controller.

FIG. 19 illustrates flowchart 410 for an embodiment method of optical switching control performed by a central controller. In step 412, the central controller receives traffic information from user nodes, for example via an optical circuit switching matrix. The traffic information indicates the destination addresses of data packets awaiting transmission at the user nodes.

In step 414, the controller schedules timeslot assignments for the user nodes. Transmissions are each assigned a timeslot, so at most one packet is transmitted to each destination user node at a time, and therefore at most one packet is transmitted at each wavelength in each timeslot. Some packets are delayed to later timeslots to avoid multiple packets being transmitted at the same wavelength at the same time. The controller attempts to minimize overall delays while avoiding wavelength contention.

In step 416, the controller transmits the timeslot assignments to the user nodes, for example via the optical circuit switching matrix.

Figure 20:
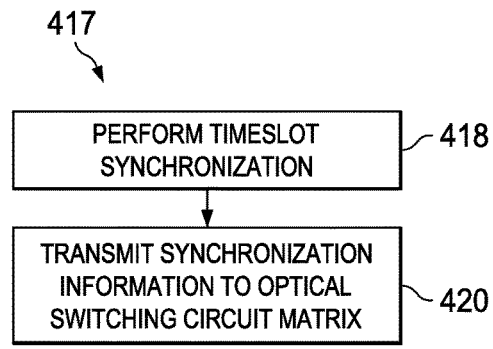
FIG. 20 illustrates a flowchart for another embodiment method of optical control performed by a centralized controller.

FIG. 20 illustrates flowchart 417 for an embodiment method of optical switching control performed by a central controller. In step 418, the controller performs timeslot synchronization. Timeslot synchronization is performed periodically, for example every timeslot. The controller monitors the arrival time at the optical switching circuit matrix of the packets transmitted from the user nodes. When the packets are not properly synchronized, the central controller determines the required change in timing and instructs the appropriate user node accordingly.

In step 420, the central controller transmits the synchronization information to the optical switching circuit matrix destined for the user nodes.

An embodiment optical interconnecting network architecture performs two dimensional (time and wavelength division) dynamic optical switching. Timeslotted, wavelength addressed transmission supports an N×N passive interconnection scheme. An embodiment optical interconnecting network architecture uses a passive coupler and WDM demultiplexer at the optical interconnecting structure, and switching is performed based on the wavelengths of individual packets. In an embodiment, a star configuration is used. An embodiment optical interconnecting network architecture has a low cost, low power consumption, low latency, large capacity, and good scalability. Embodiments may be implemented in data centers, metro switching, distributed optical transport network (OTN) switching, and other optical switching applications. An embodiment provides simple, low cost, and low power switching.

An embodiment optical circuit switching matrix includes a plurality of optical ports, each optical port being optically coupled to a respective one of a plurality of user nodes and an optical coupler having at least one input port optically coupled to the plurality of optical ports, and an output port. The optical circuit switching matrix also includes a wavelength demultiplexer having an input optically coupled to the output port of the optical coupler, and a plurality of output ports, each output port being optically coupled to a respective one of the plurality of optical ports.

An embodiment also includes an optical amplifier optically coupled between the optical coupler and the wavelength demultiplexer. In another embodiment, the optical circuit switching matrix and the plurality of user nodes are arranged in a star topology.

In an additional embodiment, the optical circuit switching matrix is electrically coupled to a central controller. For example, an optical port of the plurality of optical ports is configured to receive, from a first user node of the plurality of user nodes, a control message, and where the optical circuit switching matrix is configured to transmit the control message to the central controller. In an example, the optical circuit switching matrix is configured to receive a control response from the central controller, and where the optical port is configured to transmit the control response to the first user node. For example, the control response indicates timeslot assignments for data to be transmitted by the first user node to a second user node. In an example, the control response indicates a timing correction for data to be transmitted by the first user node to the second user node.

In an embodiment, each of the optical ports includes an optical splitter. In another embodiment, the wavelength demultiplexer is an arrayed waveguide grating router (AWGR). In an additional embodiment, the at least one input port is a plurality of input ports, where the plurality of input ports is configured to receive a plurality of input optical streams from the plurality of user nodes, and where the optical coupler is configured to combine the plurality of input optical streams to produce a combined optical stream on the output port of the optical coupler.

An embodiment method includes receiving, by an optical circuit switching matrix from a plurality of user nodes, a plurality of input optical packet streams and combining the plurality of input optical packet streams to produce a combined optical packet stream. The method also includes switching a portion of the combined optical packet stream having a first wavelength to a first user node and switching a portion of the combined optical packet stream having a second wavelength to a second user node and transmitting, by the optical circuit switching matrix to the second user node, the first switched portion of the combined optical packet stream. Additionally, the method includes transmitting, by the optical circuit switching matrix to the second user node, the second switched portion of the combined optical packet stream.

An embodiment method also includes receiving, by the optical circuit switching matrix from a first user node of the plurality of user nodes, a control message and transmitting, by the optical circuit switching matrix to a central controller, the control message. An embodiment method also includes receiving, by the optical circuit switching matrix from the central controller, a control response and transmitting, by the optical circuit switching matrix to the first user node, the control response. In an embodiment, the control response indicates timeslot assignments for data to be transmitted by the first user node to a second user node. In another embodiment, the control response indicates a timing correction for data to be transmitted by the first user node to the second user node.

An embodiment method also includes converting the plurality of input optical packet streams into a plurality of electrical input streams and transmitting, by the optical circuit switching matrix to a controller, the plurality of electrical input streams. Another embodiment method includes amplifying the combined optical packet stream. In an additional embodiment method, switching the portion of the combined optical packet stream having the first wavelength to the first user node and switching the portion of the combined optical packet stream having the second wavelength to the second user node includes switching the combined optical packet stream using a wavelength demultiplexer.

An embodiment optical circuit switching matrix includes a plurality of optical ports, each optical port being optically coupled to a respective one of a plurality of user nodes with only one optical fiber coupling each of the user nodes to the optical circuit switching matrix and an optical coupler coupled to the plurality of optical ports, and an output port. The optical circuit switching matrix also includes a wavelength demultiplexer having an input optically coupled to the output port of the optical coupler and a plurality of output ports.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A first user node comprising:
  a sole optical data transmitter, configured to:
    convert a first electrical data stream to a first optical data stream, wherein:
      the first electrical data stream is designated to be sent to a second user node,
      the first user node comprises a first address, and a first fixed wavelength predetermined to uniquely correspond to the first address,
      the second user node comprises a second address, and a second fixed wavelength predetermined to uniquely correspond to the second address before the first electrical data stream is designated to be sent to the second user node, and
      the first optical data stream is encoded on the second fixed wavelength uniquely corresponding to the second address; and
    transmit the first optical data stream from the first user node to an optical circuit node for routing of the first optical data stream to the second address according to the second fixed wavelength uniquely corresponding to the second address;
  a sole optical data receiver, configured to:
    receive, by the first user node from the optical circuit node, a second optical data stream encoded on the first fixed wavelength uniquely corresponding to the first address; and
    convert the second optical data stream to a second electrical data stream;
  a control transmitter configured to:
    convert an electrical control message to an optical control message, wherein the electrical control message is designated to be transmitted to a central controller, and wherein the optical control message is encoded on a wavelength that is dedicated for control information;
  a wavelength multiplexer optically coupled to the control transmitter and the sole optical data transmitter and configured to:
    receive the first optical data stream from the sole optical data transmitter;
    receive the optical control message from the control transmitter;
    combine the first optical data stream and the optical control message into a first combined optical data stream; and
    transmit the first combined optical data stream to the optical circuit node;
  a wavelength demultiplexer optically coupled to the sole optical data receiver and configured to:
    receive a second combined optical data stream from the optical circuit node;
    separate the second combined optical data stream into the second optical data stream and an optical control response, wherein the optical control response is encoded on a different wavelength than the optical control message; and
    send the second optical data stream to the sole optical data receiver; and
  a control receiver optically coupled to the wavelength demultiplexer and configured to:
    receive the optical control response from the wavelength demultiplexer; and
    convert the optical control response into an electrical control response.

2. The first user node of claim 1, further comprising a processor electrically coupled to the sole optical data transmitter and the sole optical data receiver, the processor configured to:
  send the first electrical data stream to the sole optical data transmitter, and
  receive the second electrical data stream from the sole optical data receiver.

3. The first user node of claim 2, further comprising a buffer electrically coupled to the processor and configured to:
  receive the first electrical data stream from the processor;
  store the first electrical data stream, wherein the first electrical data stream is stored until a time designated by an allocated timeslot; and
  send the first electrical data stream to the processor, wherein the processor is further configured to send the first electrical data stream to the sole optical data transmitter via the buffer.

4. The first user node of claim 1, wherein the wavelength that is dedicated for control information is fixed.

5. The first user node of claim 1, wherein the electrical control response indicates timeslot assignments for data to be transmitted by the first user node to the second user node.

6. The first user node of claim 1, wherein the electrical control response indicates a timing correction for data to be transmitted by the first user node to the second user node.

7. The first user node of claim 1, wherein the sole optical data transmitter comprises a tunable laser.

8. The first user node of claim 1, wherein the sole optical data transmitter comprises a fast wavelength optical switch and a multi-wavelength laser source, and wherein the fast wavelength optical switch is configured to select a wavelength for data transmission from the multi-wavelength laser source.

9. A method comprising:
converting, by a first user node, a first electrical data stream to a first optical data stream,
the first electrical data stream designated to be sent to a second user node,
the first user node comprising a first address, and a first fixed wavelength predetermined to uniquely correspond to the first address,
the second user node comprising a second address, and a second fixed wavelength predetermined to uniquely correspond to the second address before the first electrical data stream is designated to be sent to the second user node, and
the first optical data stream encoded on the second fixed wavelength uniquely corresponding to the second address;
transmitting, by a sole optical data transmitter of the first user node, the first optical data stream to an optical circuit node for routing of the first optical data stream to the second address according to the second fixed wavelength uniquely corresponding to the second address;
receiving, by a sole optical data receiver of the first user node from the optical circuit node, a second optical data stream encoded on the first fixed wavelength uniquely corresponding to the first address;
converting, by the first user node, the second optical data stream to a second electrical data stream;
converting, by the first user node, an electrical control message to an optical control message, the electrical control message designated to be transmitted to a central controller, and the optical control message encoded on a wavelength that is dedicated for control information;
combining the first optical data stream and the optical control message into a first combined optical data stream;
transmitting the first combined optical data stream to the optical circuit node;
receiving, by the first user node, a second combined optical data stream from the optical circuit node;
separating the second combined optical data stream into the second optical data stream and an optical control response, the optical control response being encoded on a different wavelength than the optical control message; and
converting the optical control response into an electrical control response.

10. The method of claim 9, further comprising:
storing, by the first user node, the first electrical data stream, wherein the first electrical data stream is stored until a time designated by an allocated timeslot.

11. The method of claim 9, wherein the wavelength that is dedicated for control information is fixed.

12. The method of claim 9, wherein the electrical control response indicates timeslot assignments for data to be transmitted by the first user node to the second user node.

13. The method of claim 9, wherein the first optical data stream is encoded on the second fixed wavelength corresponding to the second address by a tunable laser.

14. The method of claim 9, wherein the first optical data stream is encoded on the second fixed wavelength corresponding to the second address by a fast wavelength optical switch and a multi-wavelength laser source, and wherein the fast wavelength optical switch selects a wavelength from the multi-wavelength laser source.

15. A first user node comprising:
a sole optical data transmitter, configured to:
convert a first electrical data stream to a first optical data stream, wherein:
the first electrical data stream is designated to be sent to a second user node,
the first user node comprises a first address, and a first fixed wavelength predetermined to uniquely correspond to the first address,
the second user node comprises a second address, and a second fixed wavelength predetermined to uniquely correspond to the second address before the first electrical data stream is designated to be sent to the second user node, and
the first optical data stream is encoded on the second fixed wavelength uniquely corresponding to the second address; and
transmit the first optical data stream from the first user node to an optical circuit node for routing of the first optical data stream to the second address according to the second fixed wavelength uniquely corresponding to the second address; and
a sole optical data receiver, configured to:
receive, by the first user node from the optical circuit node, a second optical data stream encoded on the first fixed wavelength uniquely corresponding to the first address;
convert the second optical data stream to a second electrical data stream;
a control transmitter configured to:
convert an electrical control message to an optical control message, wherein the electrical control message is designated to be transmitted to a central controller, and wherein the optical control message is encoded on a wavelength that is dedicated for control information;
a wavelength multiplexer optically coupled to the control transmitter and the sole optical data transmitter and configured to:
receive the first optical data stream from the sole optical data transmitter;
receive the optical control message from the control transmitter;
combine the first optical data stream and the optical control message into a first combined optical data stream; and
transmit the first combined optical data stream to the optical circuit node;
a wavelength demultiplexer optically coupled to the sole optical data receiver and configured to:
receive a second combined optical data stream from the optical circuit node;
separate the second combined optical data stream into the second optical data stream and an optical control response; and send the second optical data stream to the sole optical data receiver; and a control receiver optically coupled to the wavelength demultiplexer and configured to:
receive the optical control response from the wavelength demultiplexer; and
convert the optical control response into an electrical control response indicating a timing correction for data to be transmitted by the first user node to the second user node.

16. The first user node of claim 15, further comprising a processor electrically coupled to the sole optical data transmitter and the sole optical data receiver, the processor configured to:
send the first electrical data stream to the sole optical data transmitter, and
receive the second electrical data stream from the sole optical data receiver.

17. The first user node of claim 16, further comprising a buffer electrically coupled to the processor and configured to:
receive the first electrical data stream from the processor;
store the first electrical data stream, wherein the first electrical data stream is stored until a time designated by an allocated timeslot; and
send the first electrical data stream to the processor, wherein the processor is further configured to send the first electrical data stream to the sole optical data transmitter via the buffer.

18. The first user node of claim 15, wherein the wavelength that is dedicated for control information is fixed.

19. The first user node of claim 15, wherein the optical control response is encoded on a same wavelength as the optical control message.

20. The first user node of claim 15, wherein the electrical control response indicates timeslot assignments for data to be transmitted by the first user node to the second user node.

21. The first user node of claim 15, wherein the sole optical data transmitter comprises a tunable laser.

22. The first user node of claim 15, wherein the sole optical data transmitter comprises a fast wavelength optical switch and a multi-wavelength laser source, and wherein the fast wavelength optical switch is configured to select a wavelength for data transmission from the multi-wavelength laser source.

23. A method comprising:
converting, by a first user node, a first electrical data stream to a first optical data stream,
the first electrical data stream designated to be sent to a second user node,
the first user node comprising a first address, and a first fixed wavelength predetermined to uniquely correspond to the first address,
the second user node comprising a second address, and a second fixed wavelength predetermined to uniquely correspond to the second address before the first electrical data stream is designated to be sent to the second user node, and
the first optical data stream encoded on the second fixed wavelength uniquely corresponding to the second address;
transmitting, by a sole optical data transmitter of the first user node, the first optical data stream to an optical circuit node for routing of the first optical data stream to the second address according to the second fixed wavelength uniquely corresponding to the second address;
receiving, by a sole optical data receiver of the first user node from the optical circuit node, a second optical data stream encoded on the first fixed wavelength uniquely corresponding to the first address;
converting, by the first user node, the second optical data stream to a second electrical data stream;
converting, by the first user node, an electrical control message to an optical control message, the electrical control message designated to be transmitted to a central controller, and the optical control message encoded on a wavelength that is dedicated for control information;
combining the first optical data stream and the optical control message into a first combined optical data stream;
transmitting the first combined optical data stream to the optical circuit node;
receiving, by the first user node, a second combined optical data stream from the optical circuit node;
separating the second combined optical data stream into the second optical data stream and an optical control response; and
converting the optical control response into an electrical control response indicating a timing correction for data to be transmitted by the first user node to the second user node.

24. The method of claim 23, further comprising:
storing, by the first user node, the first electrical data stream, wherein the first electrical data stream is stored until a time designated by an allocated timeslot.

25. The method of claim 23, wherein the wavelength that is dedicated for control information is fixed.

26. The method of claim 23, wherein the optical control response is encoded on a same wavelength as the optical control message.

27. The method of claim 23, wherein the electrical control response indicates timeslot assignments for data to be transmitted by the first user node to the second user node.

28. The method of claim 23, wherein the first optical data stream is encoded on the second fixed wavelength corresponding to the second address by a tunable laser.

29. The method of claim 23, wherein the first optical data stream is encoded on the second fixed wavelength corresponding to the second address by a fast wavelength optical switch and a multi-wavelength laser source, and wherein the fast wavelength optical switch selects a wavelength from the multi-wavelength laser source.

* * * * *